US009163783B1

(12) United States Patent
McLaughlin

(10) Patent No.: US 9,163,783 B1
(45) Date of Patent: Oct. 20, 2015

(54) ADJUSTABLE TELEVISION CEILING MOUNTING SYSTEM

(71) Applicant: Ronald McLaughlin, Longwood, FL (US)

(72) Inventor: Ronald McLaughlin, Longwood, FL (US)

( * ) Notice: Subject to any disclaimer, the term of this patent is extended or adjusted under 35 U.S.C. 154(b) by 247 days.

(21) Appl. No.: 13/869,500

(22) Filed: Apr. 24, 2013

Related U.S. Application Data

(60) Provisional application No. 61/637,629, filed on Apr. 24, 2012.

(51) Int. Cl.
*F24H 9/06* (2006.01)
*F16M 13/02* (2006.01)
(52) U.S. Cl.
CPC .................................. *F16M 13/022* (2013.01)
(58) Field of Classification Search
CPC .................................................... F16M 13/022
USPC ........ 248/57, 200.1, 201, 323, 325, 326, 339, 248/340, 342, 343, 546, 906, 917, 923; 52/677, 678
See application file for complete search history.

(56) References Cited

U.S. PATENT DOCUMENTS

| | | | | |
|---|---|---|---|---|
| 3,579,938 A * | 5/1971 | Hanson | ............................ | 52/365 |
| 6,345,800 B1 * | 2/2002 | Herst et al. | .................... | 248/342 |
| 6,591,574 B2 * | 7/2003 | Humphrey | ...................... | 52/678 |
| 7,959,125 B1 * | 6/2011 | Coleman | ......................... | 249/34 |
| 8,087,631 B1 * | 1/2012 | Gretz | ............................ | 248/326 |

FOREIGN PATENT DOCUMENTS

| | | | | |
|---|---|---|---|---|
| JP | 8215258 | * | 8/1996 | ............... A61G 7/05 |
| JP | 2007202100 | * | 8/2007 | ............... H04N 5/64 |

* cited by examiner

*Primary Examiner* — Gwendolyn Baxter

(57) ABSTRACT

An adjustable television ceiling mounting system attaches to an exposed ceiling board surface, and is secured by an adjustable joist support bracket mounting system. The adjustable television ceiling mounting system is capable of securely tilting, swiveling, extending, and retracting up and parallel to an exposed ceiling board surface. The adjustable television ceiling mount utilizes two motors and a hydraulic cylinder to power a retracting arm and a swiveling arm by remote control. The adjustable television ceiling mounting system can be positioned anywhere on the exposed ceiling board surface and is capable of supporting televisions greater than 50 pounds and maneuvering them easily and securely due to the supporting adjustable joist support bracket mounting system.

2 Claims, 18 Drawing Sheets

ADJUSTABLE TELEVISION CEILING MOUNTING SYSTEM

CROSS-REFERENCE TO RELATED APPLICATION

This Non-Provisional Utility Patent Application claims the benefit of U.S. Provisional Patent Application Ser. No. 61/637,629, filed on Apr. 24, 2012, which is incorporated herein in its entirety.

FIELD OF THE INVENTION

The present invention relates generally to a ceiling mounting system for a television. The adjustable television ceiling mounting system is designed for attachment to a ceiling providing an operation configuration, which orients the television in a direction optimal for viewing, and a stored configuration, which repositions the television parallel and proximate the ceiling.

BACKGROUND OF THE INVENTION

The modern television possesses myriad technological capabilities. These technological advancements have resulted in televisions with very large dimensions and weight. The audience has also become more sophisticated, demanding more dynamic viewing angles. With technology constantly expanding the capacities and dimensions of a television, supporting a heavy television in a unique and functional viewing position has become a challenge. Walls and ceilings are obvious locations to attach the television. Walls and ceilings provide ample space to attach or hang a myriad assortment of televisions. Studs or joists located behind these barriers provide structural framework for a building. These same studs and joists also offer a convenient support feature that allows fasteners and mounts such as hooks, screws or studs to be embedded therein; thereby providing a stable, protruding peg or mounting.

Walls traditionally utilize 2×4 studs located behind drywall or stucco. The studs are commonly fabricated of pine or aluminum. These studs are generally in a close spatial relationship to each other and easily located by tapping the wall and listening for different reverberations, or utilizing an electronic stud finder. Studs are commonly located 16 inches on center. This provides plenty of options for locating an area on the wall to hang an object. Furthermore, wall studs provide sufficient grip for the fasteners and mounts to support the general assortment of light objects that attach to walls, e.g., pictures, clocks, and the like. The forces subjected to the mount are normally substantially perpendicular to the mounting fastener. This configuration dictates a support force that is along a longitudinal axis of the wall stud, which is well supported. One issue when mounting an object to wall studs is the span between two adjacent studs. The mount needs to span a minimum of 16" to be secured to each of two adjacent studs. This can direct unsightly mounting scenarios.

Ceiling joists, are located 24" on center thus dictating a wider span for mounting. Further, ceiling joists introduce additional problems respective to mounting an object. One key difference is the direction of the force subjected to the fastener. The forces subjected to the mount are normally substantially parallel to the mounting fastener. This configuration relies upon a support force that is provided between the fastener threads and the ceiling joist. This attachment interface is less reliable, where the threaded portion of the fastener can become dislodged from the ceiling joist.

Ceiling joists, such as beams and rafters, are initially difficult to locate. Ceilings can be difficult to access from beneath due to their height, and from above due to limited space in an attic. Objects that hang from the ceiling, such as ceiling fans, lighting fixtures, and the like, generally require a more specific location than wall objects because of the functional needs thereof. Thus, while finding a joist is difficult— finding a joist in a desired location is even more difficult. Another significant consideration is the weight of the object being supported by the mounting configuration. Objects that are hung from the ceiling are typically heavy. The forces applied to the mounting hardware are in the weakest direction of the fastener interface, wherein the forces are parallel to the longitudinal axis of the fastener. This scenario relies upon a tensile strength of the fastener interface for sole support, compared to a wall mount configuration where the scenario relies upon the fastener cross sectional area and resulting shear strength to support the object. A mounting or fastening such as a nail, screw, lag bolt, and the like will not provide sufficient grip with the joist to support these heavier objects. Insertion of a fastener into the ceiling joist creates a weak point.

The fastener interface can be strengthened by utilizing longer and/or larger diameter fasteners, or by embedding the fasteners at varying angles. However, the fact that most joists are made of wood will always limit the fastener's tensile capacity.

As previously mentioned, ceiling joists are spaced apart at 24 inches on center. The spacing is dictated by common building codes. The spacing locates the joists across a ceiling, where the joists may not pass through a desired location for mounting an object.

There are several devices and techniques in the prior art for performing this support mounting task. One technique is to introduce a cross beam, where the cross beam spans between two adjacent ceiling joists. The cross beams can be secured to the ceiling joist using any fastener techniques, including nails, threaded fasteners, brackets, and the like. While cross beams aid in the support by providing a beam segment for attachment, the mounting process they still relies upon vertically attached fasteners, which are susceptible to parallel tensile forces.

Another known method of mounting an object to a ceiling is represented by a roof mount awning, which are capable of supporting patio related objects from a roof. This mounting configuration is not adaptable to an indoor installation.

Stands, cabinets, entertainment centers, and the like are provided to support a television set. These stands are commonly utilized in any room where a television set may reside. Some stands include a feature enabling the user to rotate the television to vary the viewing angle.

Wall mount systems are provided to support televisions from a wall. These are more applicable for supporting flat panel or LCD televisions. Wall mount systems are usually located respective to a vertical wall stud, wherein the wall stud provides the required structural support for the system and respective television. Some wall mount systems include a vertical adjustment interface enabling the system to vertically position the television. The wall mount systems may include a rotational interface enabling the viewer to rotate the television to slightly adjust the viewing angle. The degree of rotation is commonly limited by the supporting wall.

Ceiling mount systems are available and can provide a different storage scenario and a unique vantage point for the audience to view the television. The ceiling mount systems are commonly mounted in a location based upon the layout of the ceiling joists.

The narrow wide of flat panel televisions dictates special considerations for support or mounting. Flat panel television mounting structures are generally designed for attachment to a wall or from a ceiling. This type of mounting takes advantage of the flat panel configuration's aesthetic thin shape, and allow for flexibility in providing a location to place the flat panel. While wall mounts are limited in their swiveling capacity, ceiling mounts are capable of a larger tilt and wider swivel movement. However, ceiling mounts have a limited weight capacity.

Wall mounts are dependent on locating a wall stud. The rotation of the flat panel television is directly related to the distance the television is mounted from the wall. The closer the television set is mounted to the wall, the smaller the degree of rotation.

Ceiling mount placement is also dependent on the location of ceiling joists. Since ceiling mounts are commonly dependent upon a tensile strength of a fastener, the ceiling mounts are often weight limiting respective to the objects that are to be supported. A ceiling mount's weight capacity is generally totally dependent on the attachment interface with the ceiling joist. Another limitation noted regarding ceiling mounts is that cables and cords are commonly visible since there is very little space on the ceiling to hide them.

There have been two types of wall and ceiling mounts in the prior art. A low profile mount is one which offer less features but suitable for large size, heavy televisions. A common range associated with this group of televisions includes those having a diagonal screen dimension of 32 to 63 inches. The low profile mount is generally a fixed wall mount style. This mount form factor is considered to be less than desirable aesthetically and provides few options for hiding cords and wires from the television.

Alternatively, a high profile mount, include additional features such as horizontal swiveling and vertical tilting to various angles and degrees. The movements can be manual or automated, wherein the mount would include an automated drive mechanism such as a motor. The current configurations are limited to a maximum size of 32 inches or a weight of 40 pounds based upon their structure and mounting limitations. The ceiling mount needs to be located respective to a ceiling joist, which may or may not provide the optimum viewing condition. Also, the high profile mount is not very effective for providing anti-theft and safety measures.

Even though the above cited adjustable television ceiling mounting system addresses some of the needs of the market, a device for locating a desired location on the ceiling and securely attaching a heavy television while allowing the television to easily swivel, tilt, extend, and store by retracting upward into a configuration that is parallel to the ceiling is still desired.

SUMMARY OF THE INVENTION

This invention is directed to an adjustable television ceiling mounting system that receives support from an adjustable joist support bracket mounting system that adjustably braces between ceiling joists to provide greater support than joists alone can provide. The adjustable television ceiling mounting system is capable of securely tilting, swiveling, extending, and retracting up and parallel to an exposed ceiling board surface. The adjustable television ceiling mount utilizes two motors and a hydraulic cylinder to power a retracting arm and a swiveling arm by remote control. The adjustable television ceiling mounting system can be positioned anywhere on the exposed ceiling board surface and is capable of supporting televisions greater than 50 pounds and maneuvering them easily and securely due to the supporting adjustable joist support bracket mounting system.

A first aspect of the present invention provides an adjustable television ceiling mounting system comprising:

a telescoping beam assembly comprising a first telescoping member, a second telescoping member slideably engaging with said first telescoping member, and a telescoping assembly lock, wherein said telescoping assembly lock secures said first telescoping member and said second telescoping member together;

a pair of joist mounting brackets, each joist mounting bracket comprising a joist support surface, wherein each joist mounting bracket is pivotally assembled to the telescoping beam assembly at a respective end thereof; and at least one object support subassembly comprising:
   a support assembly horizontal adjustment coupler slideably assembled to the telescoping beam assembly,
   a support assembly vertical adjustment sleeve carried by the support assembly horizontal adjustment,
   a vertical adjustment member passing through the support assembly vertical adjustment sleeve,
   at least one vertical positioning fastener for securing the vertical adjustment member at a vertical position,
   an object support bracket carried by the vertical adjustment member, and
   at least one object support fastener attached to the object support bracket.

In a second aspect, the object support bracket is rotationally coupled to the vertical adjustment member.

In another aspect, the vertical adjustment member is a threaded rod.

In another aspect, the vertical positioning fastener is a threaded fastener.

In another aspect, the object support subassembly comprises a section of the vertical adjustment member having a pair of female threaded vertical positioning fasteners positioned at each end of the support assembly vertical assembly sleeve, wherein the pair of female threaded vertical assembly fasteners lock the vertical adjustment member into a desired height.

In another aspect, the object support subassembly comprises at least one female threaded vertical positioning fastener positioned at a respective end of the support assembly vertical assembly sleeve, wherein the at least one female threaded vertical positioning fastener is used to lock the vertical adjustment member at a desired height.

In another aspect, the support assembly vertical adjustment sleeve is configured with a smooth interior wall surface and the object support subassembly comprises a pair of female threaded vertical positioning fasteners, each fastener positioned at a respective end of the support assembly vertical assembly sleeve, wherein the female threaded vertical positioning fasteners are used to lock the vertical adjustment member at a desired height.

In another aspect, the support assembly vertical adjustment sleeve is configured with a threaded interior wall surface and the object support subassembly comprises a female threaded vertical positioning fastener, the fastener positioned at one of the ends of the support assembly vertical assembly sleeve, wherein the female threaded vertical positioning fastener is used in conjunction with the threaded interior surface to lock the vertical adjustment member at a desired height.

In another aspect, the adjustable joist support bracket mounting system can be adapted to fit between a pair of adjacently positioned ceiling joists by extending or collapsing the telescoping beam assembly.

In another aspect, the telescoping beam assembly can be locked into a desired length using a locking mechanism. An exemplary locking mechanism is a set screw.

In another aspect, the first telescoping member is sized and shaped to be slideably inserted into the second telescoping member, wherein an outer surface of the first telescoping member slideably engages with an interior surface of the second telescoping member.

In another aspect, the joist mounting bracket pivots to position where a vertical joist mounting segment of the joist mounting bracket abutting a mating side surface of the ceiling joist.

In another aspect, a joist support surface of the joist mounting bracket is carried by an upper surface of the joist, wherein a normal force is provided by compression.

In yet another aspect, the adjustable joist support bracket mounting system comprises additional apparatus support subassemblies to support increased weights attached to the exposed ceiling board surface.

In another aspect, the adjustable joist support bracket mounting system reduces vertical tensile forces and weight stress on the joist by bracing against the sides of two joists to create a more evenly dispersed compressive force.

In another aspect, in operation, the mounting locations would be determined and marked accordingly on the exposed ceiling board surface. Apertures are then drilled upward from the exposed ceiling board surface therethrough. The adjustable joist support bracket mounting system is positioned against a concealed ceiling board surface, aligning and inserting at least one object support fastener through the drilled apertures. The telescoping beam assembly is extended outward, until each of the joist mounting brackets abut a respective ceiling joist. The joist mounting brackets pivot until they are parallel with the mating section of the ceiling joist. The object support subassemblies adjust the height of the adjustable joist support bracket mounting system to rest the joist support surface onto the top surface of the joist. The adjustable joist support bracket mounting system support system is secured into location by locking the telescoping assembly lock, fastening the vertical positioning fasteners, and positioning screws, nails or the like through at least one joist attachment aperture. Once secured, the object beneath secures against the exposed ceiling board surface by attaching to the object support fasteners protruding through the exposed ceiling board surface with flange nuts, lock nuts, or the like.

One benefit of the adjustable joist support bracket mounting system is that it provides greater flexibility in hanging or attaching objects to the ceiling board by providing an adjustable ceiling mounting system that can be placed anywhere on the ceiling board independent of the location of the ceiling joists.

Another benefit is that the adjustable joist support bracket mounting system provides a lightweight, mobile ceiling mounting system that can easily be moved to different areas of the ceiling board or to different buildings.

In yet another benefit, the adjustable joist support bracket mounting system provides structural support to a weak ceiling joist by leveraging the strength of adjacent joists.

A first aspect of the present invention provides an adjustable television ceiling mounting system comprising:
at least one ceiling rail, each ceiling rail comprising a ceiling rail contact surface, at least one flange nut slot, at least one flange nut, and a ceiling rail guide aperture, wherein said ceiling rail abuts against an exposed ceiling board surface and secures to an object support fastener with said flange nuts,
a mounting platform having a mounting platform exposed surface and a mounting platform concealed surface,
a retracting motor pivotally attached to said mounting platform,
a retracting motor rotation bar extending from said retracting motor at a rotation bar first end,
a retracting arm attached to said retracting motor rotation bar at a rotation bar second end, the retracting arm comprising a retracting arm external housing for hiding a power cord,
a retracting arm brace defined by a retracting arm brace first end attached to said mounting platform, and a retracting arm brace second end pivotally attached to said retracting arm,
a swiveling arm defined by a swiveling arm first end extending from said retracting arm, and a swiveling arm second end,
a swiveling motor, said swiveling motor pivotally attached to a swiveling motor mount,
a hydraulic cylinder pivotally attached to said swiveling motor mount, said hydraulic cylinder defined by a hydraulic cylinder first end and a hydraulic cylinder second end,
a vertical television rail having a vertical television rail contact surface attached perpendicularly to a horizontal television rail having a horizontal television contact surface, and
a television attachment brace attached to said swiveling arm second end, the television attachment brace having a television attachment brace contact surface for attaching to and abutting against a television mounting surface.

In a second aspect, a ceiling rail contact surface abuts parallel to the exposed ceiling board surface and comprises a flange nut slot that positions through the object support fastener, whereby a flange nut secures the ceiling rail to the object support fastener.

In another aspect, the mounting platform attaches between two ceiling rails and forms a planar base with a mounting platform exposed surface against the exposed ceiling surface.

In another aspect, the retracting motor pivotally attaches to the mounting platform and attaches to a retracting motor rotation bar.

In another aspect, the retracting motor is powered by a power cord.

In another aspect, the retracting motor rotation bar extends from the retracting motor and attaches to the retracting arm.

In another aspect, a retracting arm brace is defined by a first end that attaches to the mounting platform and a second end that pivotally attaches to the retracting arm.

In another aspect, the retracting arm receives support from the retracting arm brace and operatively attaches to the retracting motor rotation bar, whereby the retracting arm is capable of both retracting up into and parallel to the ceiling, and extending vertically to 180 degrees.

In another aspect, the retracting arm comprises a retracting arm external housing that hides the power cord.

In another aspect, a swiveling arm attaches to the retracting arm at a first end and a television attachment brace at a second end, whereby the swiveling arm is capable of swiveling laterally up to 30 degrees.

In another aspect, the hydraulic cylinder is defined by a first end that pivotally attaches to the horizontal television rail and a second end that pivotally attaches to the television attachment brace.

In another aspect, the hydraulic cylinder is capable of acting as a mechanical actuator to provide linear stability for the swiveling function and allow for small swiveling increments.

In another aspect, the swiveling motor abuts against the hydraulic cylinder and pivotally attaches to the swiveling arm.

In another aspect, the swiveling motor is powered by the power cord.

In another aspect, two vertical television rails position perpendicular and outside of two horizontal television rails, both of which attach to the swiveling arm.

In another aspect, two vertical television rail contact surfaces abut against the back side of the television.

In another aspect, two horizontal television rail contact surfaces abut at a plurality of specific contact points against two vertical television rails.

In another aspect, the television attachment brace attaches to the swiveling arm and abuts against and securely fastens to the back of the television.

In another aspect, in operation, the mounting location for the ceiling rails on the exposed ceiling surface would be determined by the position of the object support fasteners. The flange nut slots are positioned through the object support fasteners and secured with flange nuts. The mounting platform should abut parallel to the exposed ceiling surface. With the adjustable television ceiling mounting system in the retracted position, the back of the television is secured against both the television attachment brace contact surface and the vertical television rail contact surface with fasteners such as screws, clips, bolts, and nuts. The horizontal television rail also serves to provide guidance and support for the back of the television. The retracting motor power cord is attached to a power source, whereby both the retracting motor and swiveling motor are activated. A remote control dictates movements for the retracting motor and the swiveling motor. The retracting motor rotation bar extends from the retracting motor and operatively moves the retracting arm. The retracting arm extends out to 180 degrees and retracts back towards the exposed ceiling surface until the desired height is attained. The swiveling arm laterally tilts the television 30 degrees until the desired viewing angle is obtained. The hydraulic cylinder is capable of acting as a mechanical actuator to provide linear stability for the swiveling function and allow for small swiveling increments.

One benefit of the adjustable television ceiling mounting system is that it is capable of securely extending, retracting, and swiveling heavy televisions from the ceiling by remote control.

Another benefit of the adjustable television ceiling mounting system is that it allows for greater flexibility in hanging or attaching televisions to the ceiling by providing an adjustable ceiling mounting system that can be placed anywhere on the ceiling irrespective of the location of the ceiling joists.

Another benefit of the adjustable television ceiling mounting system is that it provides a sufficiently secure connection between the object support fasteners and the ceiling rails to effect greater anti-theft capabilities.

Another benefit of the adjustable television ceiling mounting system is that it provides sufficiently secure connections between the television attachment brace and a heavy television to reduce the risk of the television falling from the ceiling, even while adjusting positions.

These and other advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

Figure 1:
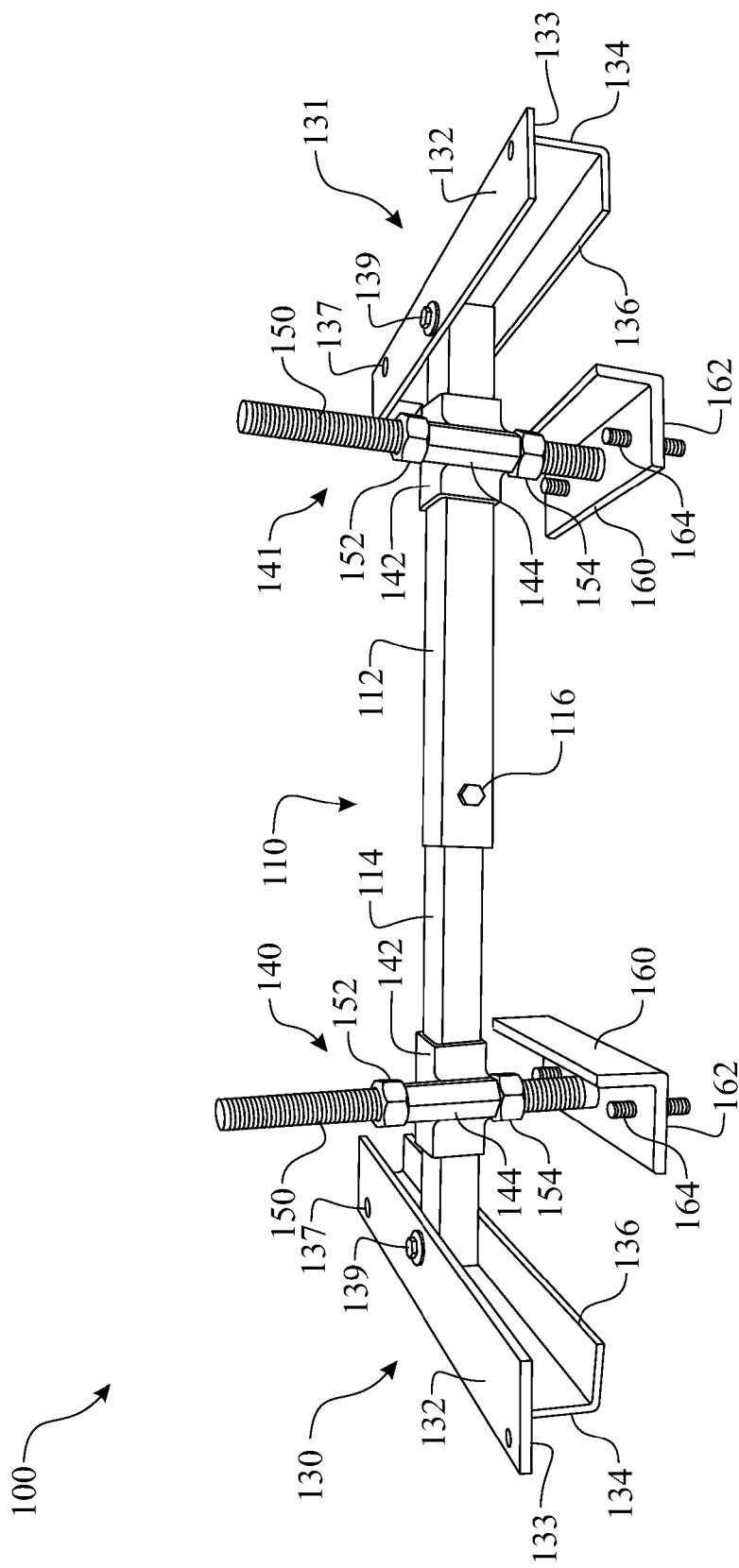
FIG. 1 presents a detailed perspective view of an adjustable joist support bracket mounting system.
Figure 2:
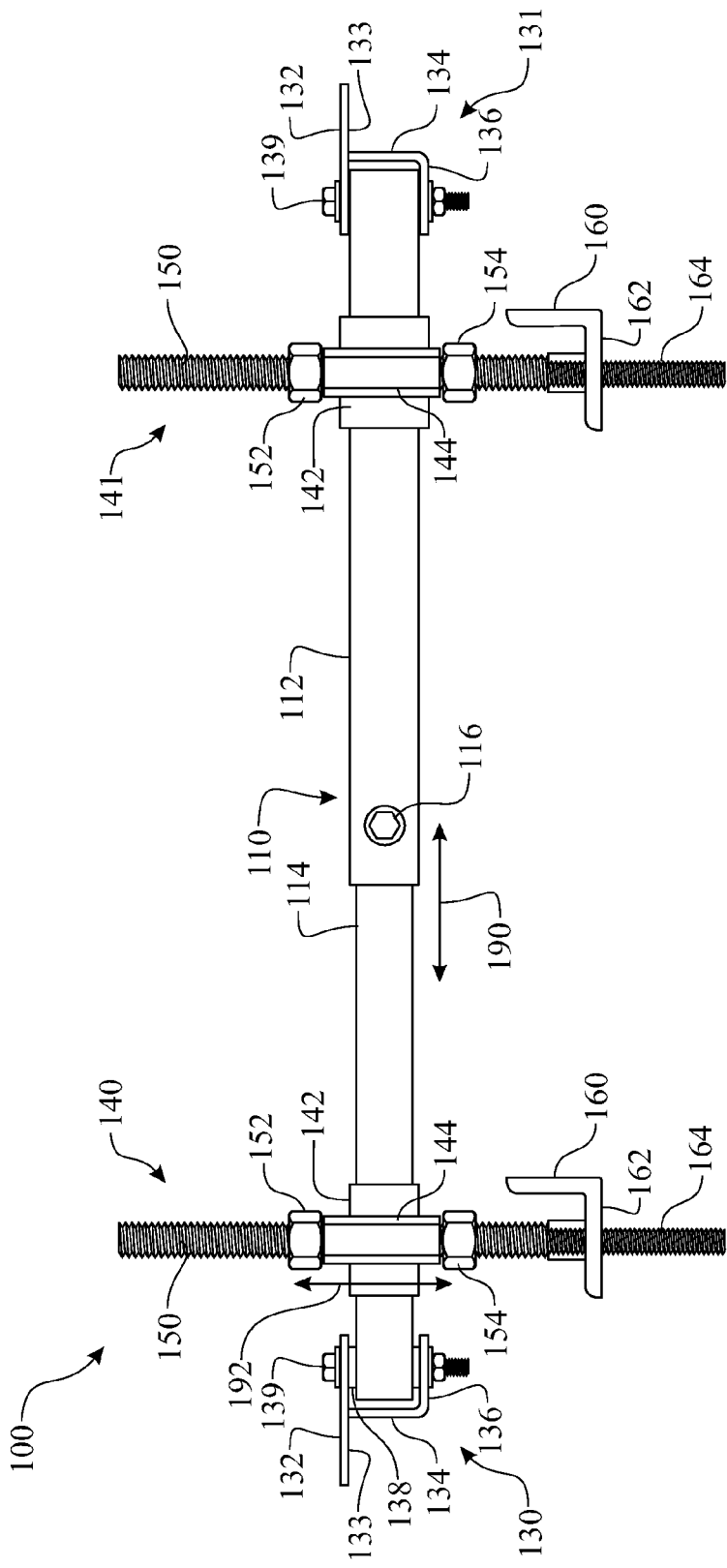
FIG. 2 presents an elevated side view of the adjustable joist support bracket mounting system originally introduced in FIG. 1.
Figure 3:
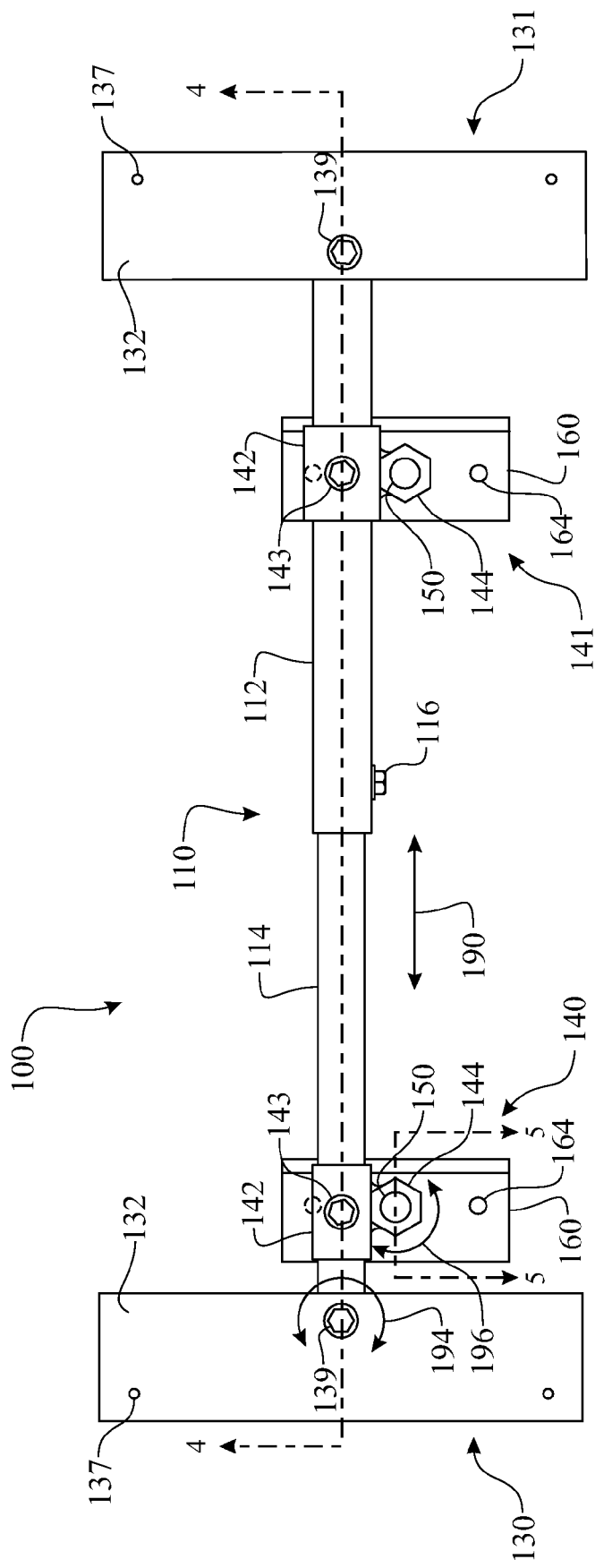
FIG. 3 presents a top view of the adjustable joist support bracket mounting system originally introduced in FIG. 1.
Figure 4:
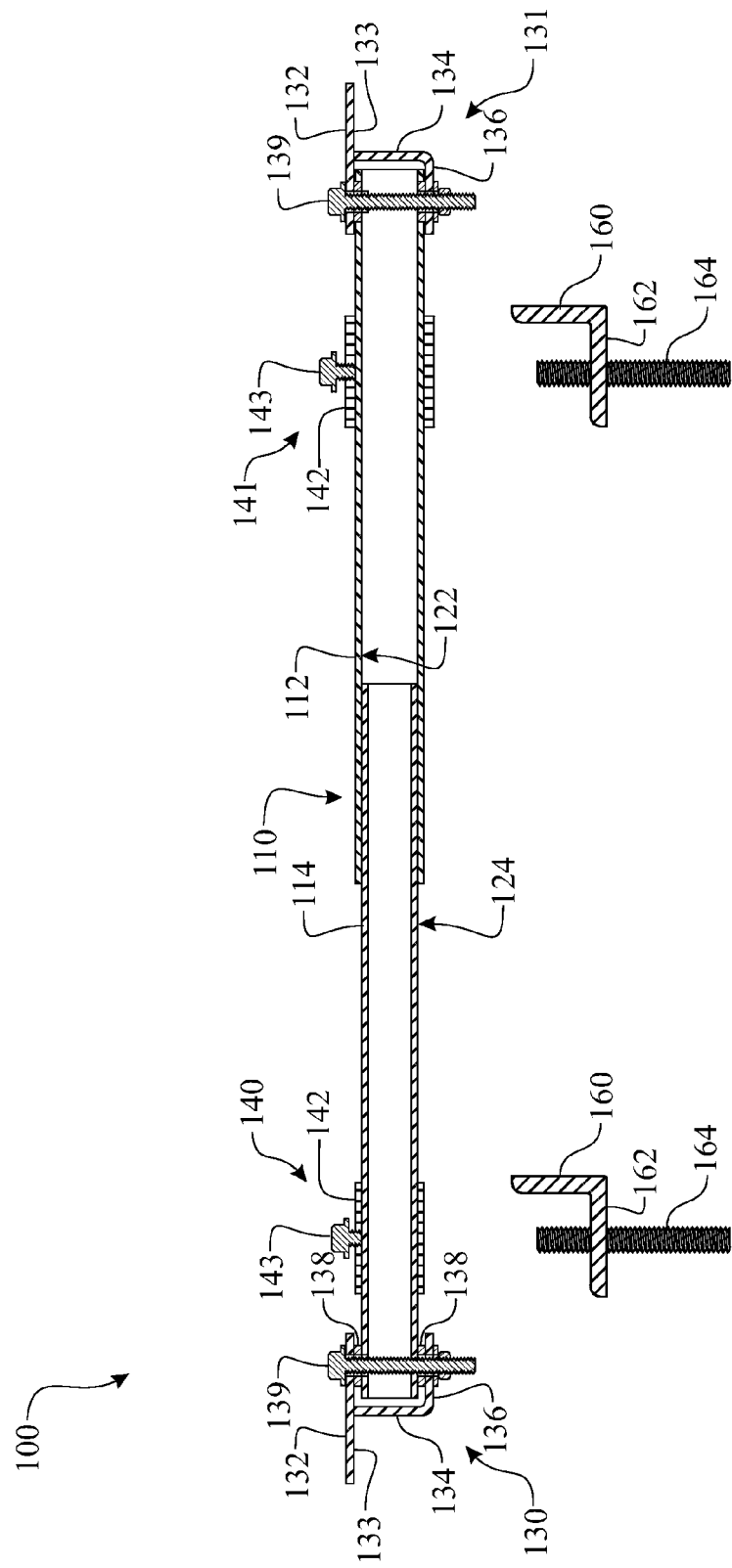
FIG. 4 presents a sectioned side view of the adjustable joist support bracket mounting system, the section taken along section 4-4 of FIG. 3, detailing a width adjusting interface of a telescoping beam assembly.
Figure 5:
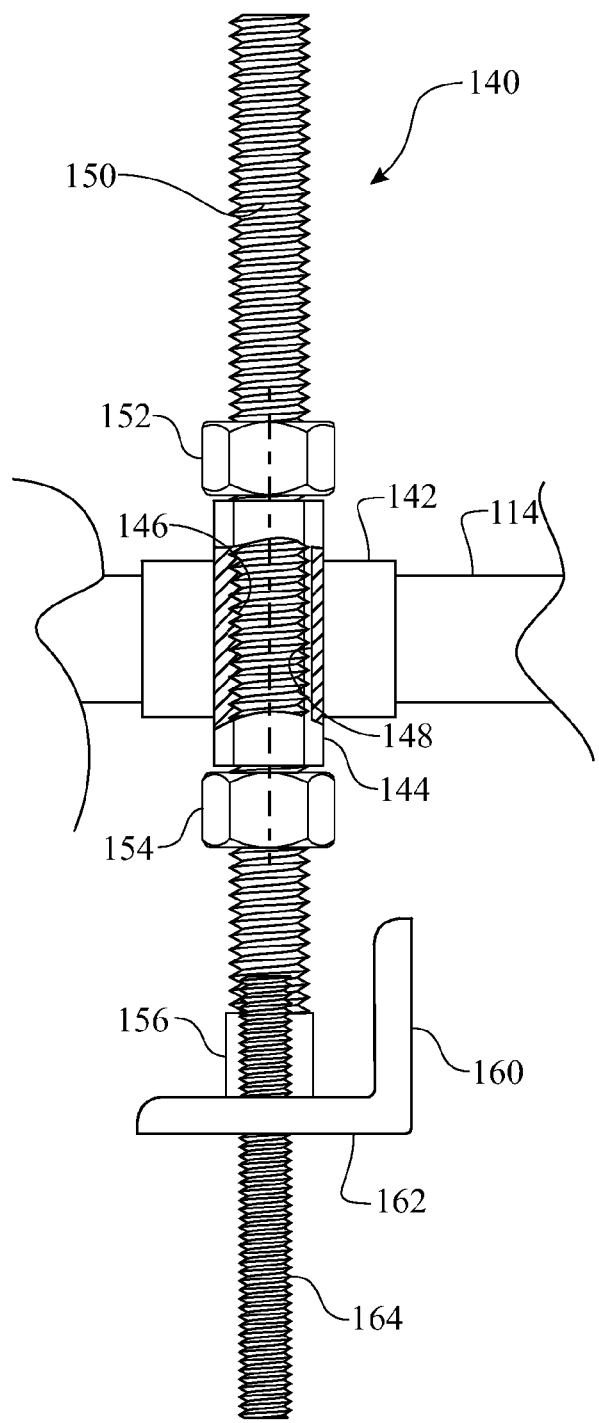
FIG. 5 presents a sectioned view of the adjustable joist support bracket mounting system, the section taken along section 5-5 of FIG. 3, detailing a height adjusting threaded leg.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 6:
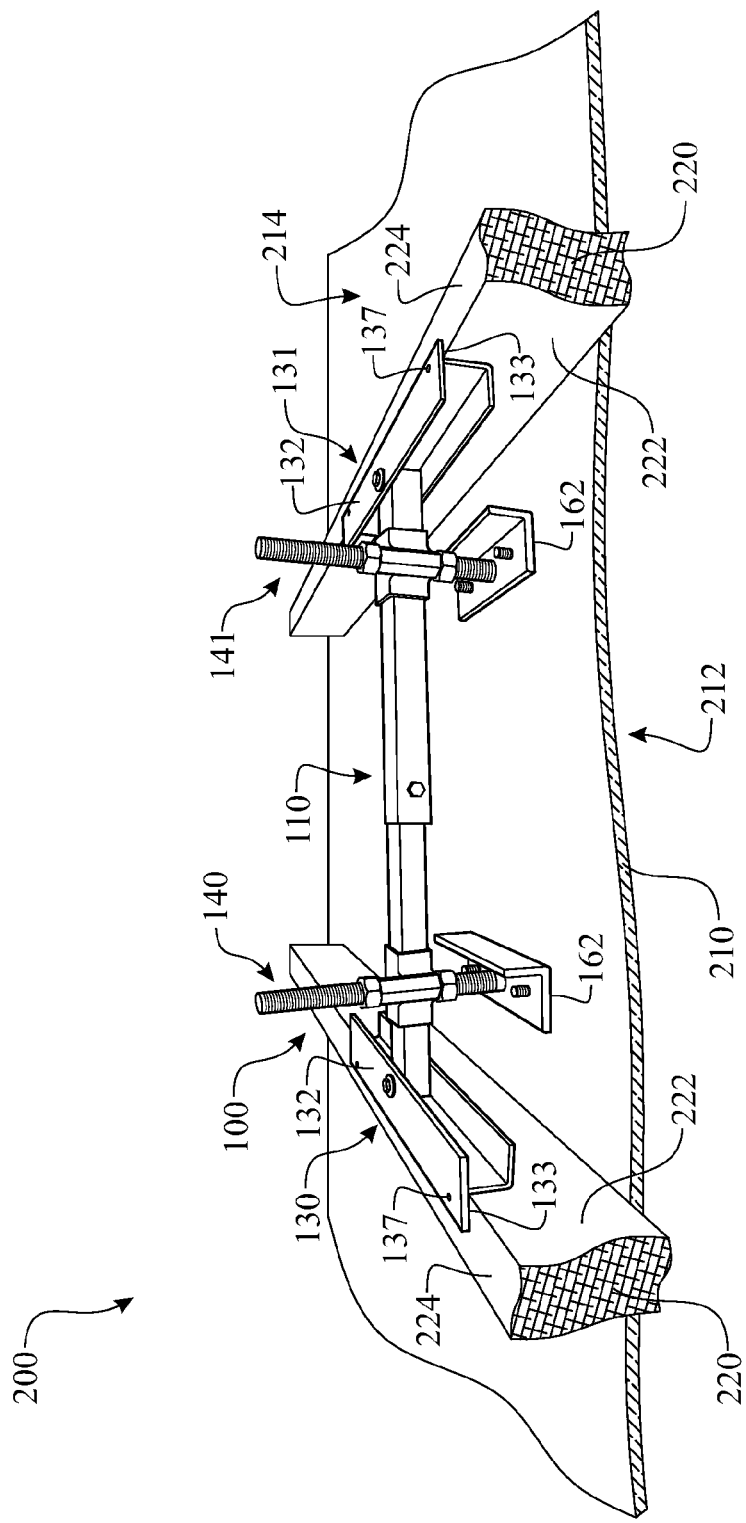
FIG. 6 presents a perspective view of an exemplary installation of the adjustable joist support bracket mounting system mounted between a pair of ceiling joists.

The modern television 400 possesses a myriad of technological capabilities. These advancements have resulted in televisions 400 with very large dimensions and weight. The audience has also become more sophisticated, demanding more dynamic viewing angles. With technology constantly expanding the capacities and dimensions of a television 400, supporting a heavy television 400 in a unique and functional viewing position has become a challenge. One exemplary adaptation of an adjustable television ceiling mounting system 100 is as follows:

The adjustable joist support bracket mounting system 100 is described in FIGS. 1 through 5. The adjustable joist support bracket mounting system 100 is an assembly comprising: a telescoping beam assembly 110 having a first joist mounting bracket 130 pivotally attached at a first end and a second joist mounting bracket 131 pivotally attached at an opposite end thereof. The joist mounting bracket 130, 131 are provided for securing the adjustable joist support bracket mounting system 100 between a pair of adjacently located ceiling joists ceiling joist 220 (FIG. 6). At least one first object support subassembly 140 is assembled to the telescoping beam assembly 110 for supporting an object therefrom.

The telescoping beam assembly 110 is fabricated having a first telescoping member 112 and a second telescoping member 114 slideably assembled together, wherein a second telescoping member outer surface 124 of second telescoping member 114 are sized and shaped to slideably engage with a first telescoping member inner surface 122 of first telescoping member 112. The first telescoping member 112 and second telescoping member 114 move respective to one another in association with a telescoping motion 190. A telescoping assembly lock 116 can be included to secure the first telescoping member 112 and second telescoping member 114 when placed into a desired span. The exemplary telescoping assembly lock 116 is a setscrew, wherein the telescoping assembly lock 116 applies a mechanical force to one of the members 112, 114 and a frictional force to the other 112, 114. It is understood that the telescoping assembly lock 116 can be any locking interface, which applies any locking force to the two telescoping members 112, 114.

The joist mounting bracket 130, 131 are preferably attached to each respective end of the telescoping beam assembly 110 using a pivot fastener 139. Each joist mounting bracket 130, 131 includes a upper joist mounting segment 132 and a lower joist mounting segment 136 located in a parallel arrangement having a vertical joist mounting segment 134 extending therebetween. The joist mounting bracket 130, 131 can be fabricated of a steel or similar extrusion. The respective end of the telescoping beam assembly 110 is inserted between the upper joist mounting segment 132 and the lower joist mounting segment 136; being secured together by a pivot fastener 139 passing through the upper joist mounting segment 132, the respective end of the telescoping beam assembly 110, and the lower joist mounting segment 136. A spacer 138 is positioned between the upper joist mounting segment 132 and the respective telescoping member 112, 114 to compensate for differences in size and shape between the first telescoping member inner surface 122 and second telescoping member outer surface 124. It is preferred that the lower joist mounting segment 136 terminate at the vertical joist mounting segment 134, enabling the vertical joist mounting segment 134 to contact the joist upper surface 224 (FIG. 6) of the ceiling joist 220. A portion of the upper joist mounting segment 132 extends past the vertical joist mounting segment 134 providing a joist support surface 133, wherein the joist support surface 133 is placed upon a joist vertical surface 222 (FIG. 6) of the ceiling joist 220 for support of the adjustable joist support bracket mounting system 100. The second joist mounting bracket 131 can then pivot in accordance with a joist bracket rotational motion 194 as needed to be positioned against the ceiling joist 220 (FIG. 6). At least one joist attachment aperture 137 allow bolts, nails, screws, and the like to further secure the second joist mounting bracket 131 on to the joist vertical surface 222. The exemplary pivot fastener 139 is a threaded fastener assembly including a bolt and a nut. It is understood that the pivot fastener 139 can be offered in any of many known form factors, including a pin, a rivet, a clip, and the like.

Those skilled in the art can appreciate the joist mounting bracket 130, 131 can be rigidly fixed to the respective ends of the telescoping beam assembly 110 in a less adapting embodiment.

Each of the object support subassembly 140, second object support subassembly 141 includes a support assembly vertical adjustment sleeve 144 carried by a support assembly horizontal adjustment coupler 142. The support assembly horizontal adjustment coupler 142 is slideably assembled to each of the telescoping members 112, 114. The support assembly horizontal adjustment coupler 142 enables the object support subassembly 140, 141 to be slideably positioned at any point along the respective telescoping member 112, 114. A horizontal set screw 143 is provided to secure the object support subassembly 140, second object support subassembly 141 in the desired location. The horizontal set screw 143 can be any locking mechanism, and preferably similar to the telescoping assembly lock 116. The telescoping assembly lock 116 can be located in any easy to access location, preferably being the top or far regions of the support assembly horizontal adjustment coupler 142.

An object support bracket 160 having an angled extrusion comprising an "L-shaped" cross section. The object support bracket 160 is secured to a vertical adjustment member 150, preferably at a lower end. The object support bracket 160 can be rotationally assembled to the vertical adjustment member 150 using any of many well-known mechanical attachments, thus enabling a support bracket rotational motion 196. Each object support bracket 160 includes two object support fasteners 164 that are located at a respective end of the object support bracket 160 and pass through the ceiling interface surface 162, which positions against a desired location on the concealed ceiling board surface 214 (FIG. 6). The object support fasteners 164 pass through a threaded rod seat 156 and an aperture in the ceiling board 210 (FIG. 6). Fasteners such as flange nuts, lock nuts and the like can secure an object from an exposed ceiling board surface 212 (FIG. 6) to the ceiling interface surface 162.

Those skilled in the art can appreciate the object support bracket 160 can be rigidly fixed to the vertical adjustment member 150 in a less adaptive embodiment.

The vertical adjustment member 150 is vertically adjustable in accordance with a vertical positioning motion 192, which enables the installer to properly position the object support bracket 160 against a concealed ceiling board surface 214 (FIG. 6). The vertical adjustment can be accomplished by employing any of many known adjustment interfaces. The vertical adjustment member 150 can be secured in location using a first vertical positioning fastener 152, a second vertical positioning fastener 154 or both. The exemplary embodiment illustrates a vertical adjustment member 150 fabricated of a threaded rod and at least one first vertical positioning fastener 152, 154 being a mating nut for vertically positioning and subsequently locking the rod in position.

The interior passage of the support assembly vertical adjustment sleeve 144 can have a threaded interior surface 146 or a smooth interior surface 148. The threaded interior surface 146 enables the utilization of the first vertical positioning fastener 152, whereas the smooth interior surface 148 dictates the inclusion of both the first vertical positioning fastener 152 and the second vertical positioning fastener 154. It is understood that any axially adjustable and locking interface can be utilized to provide vertical adjustment of the vertical adjustment member 150. The vertical adjustment of the vertical adjustment member 150 translates the position of the object support bracket 160 accordingly.

Figure 7:
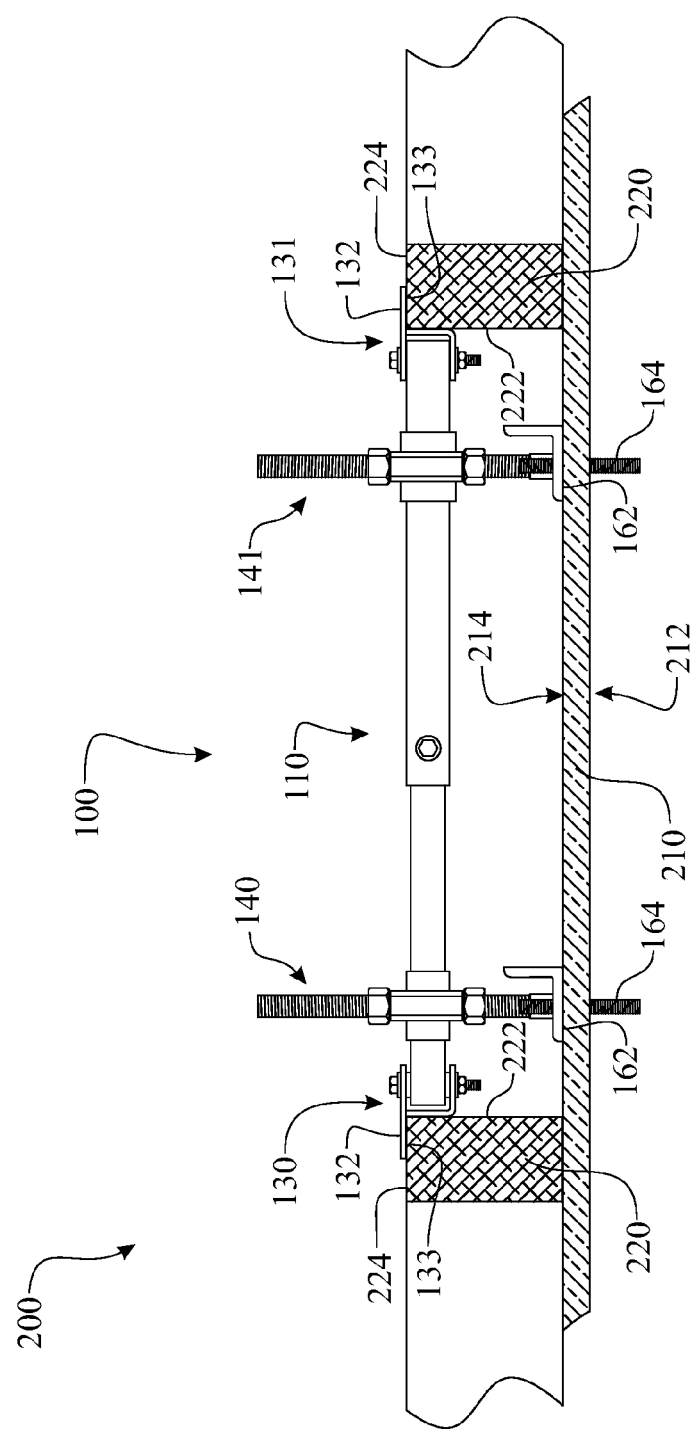
FIG. 7 presents a perspective view of the exemplary installation originally illustrated in FIG. 6.
Figure 8:
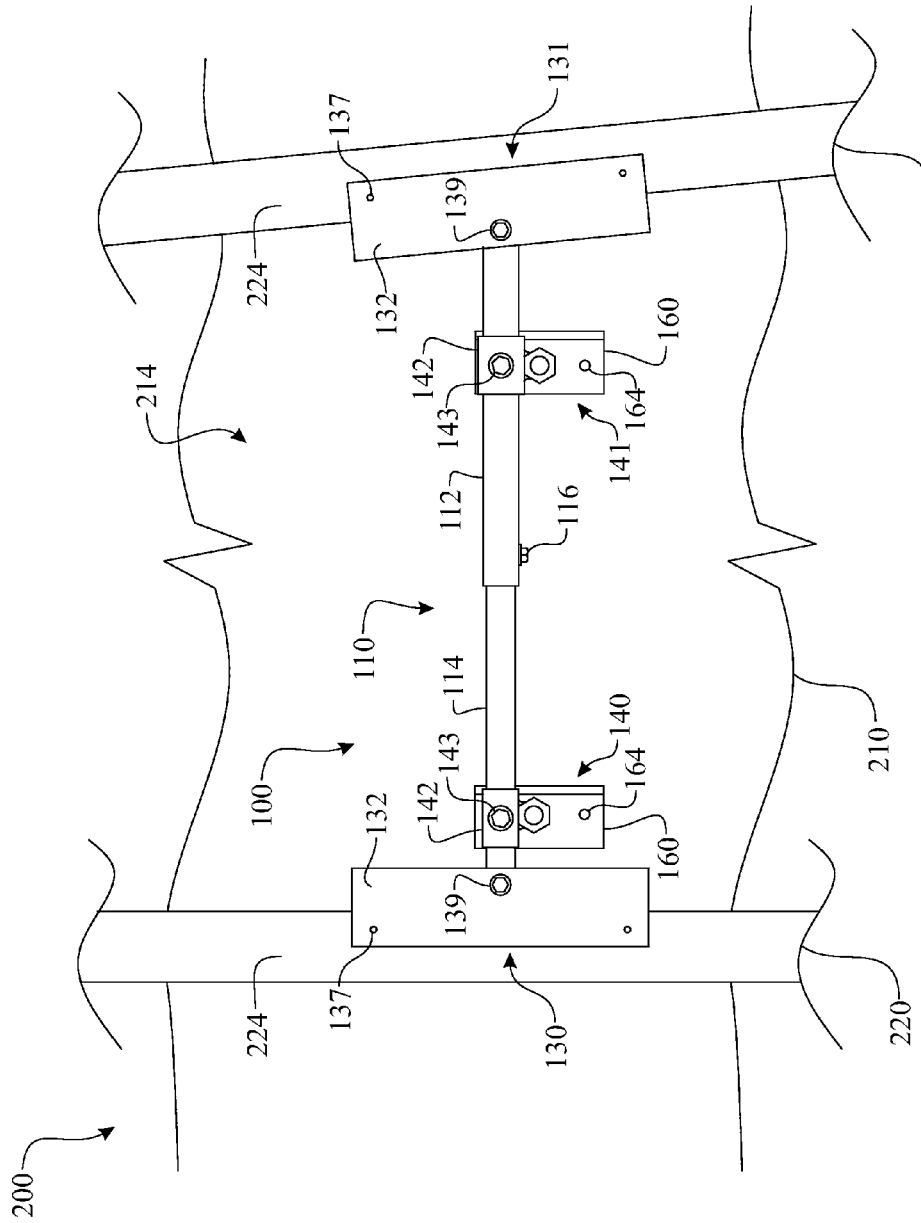
FIG. 8 presents a top view of the exemplary installation originally illustrated in FIG. 6.
Figure 9:
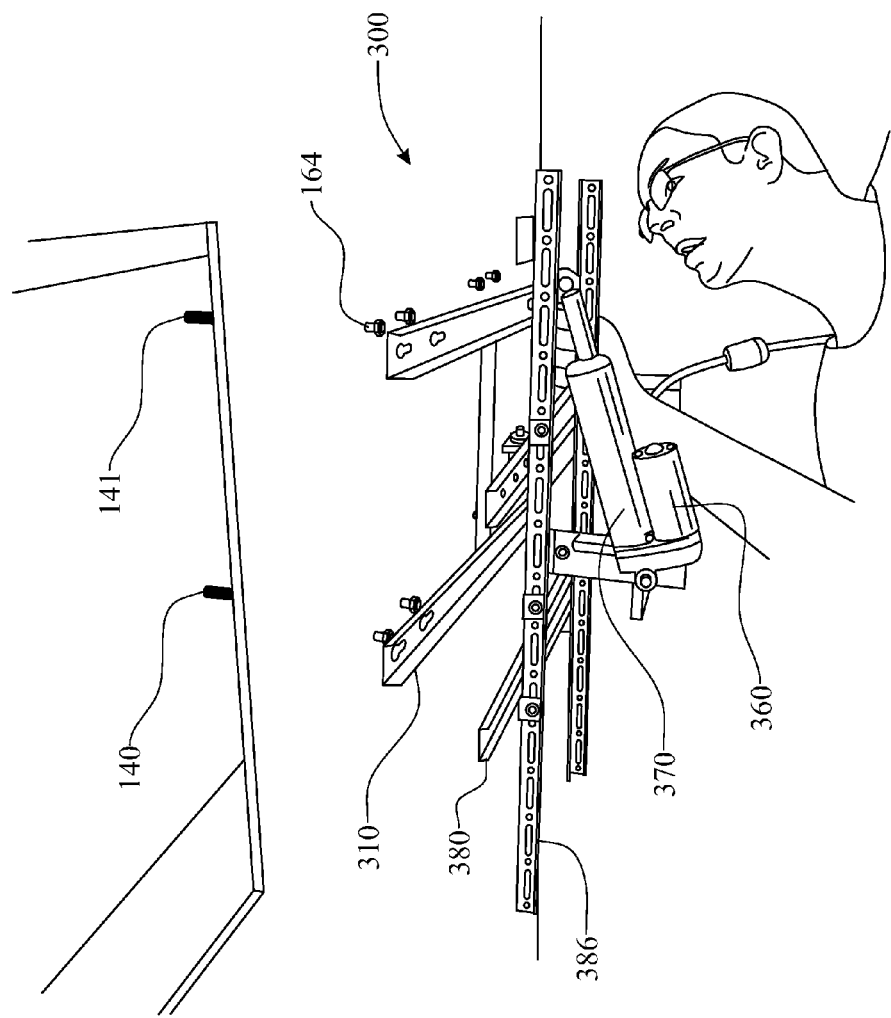
FIG. 9 presents a perspective view of an exemplary installation of the adjustable television ceiling mounting system.
Figure 10:
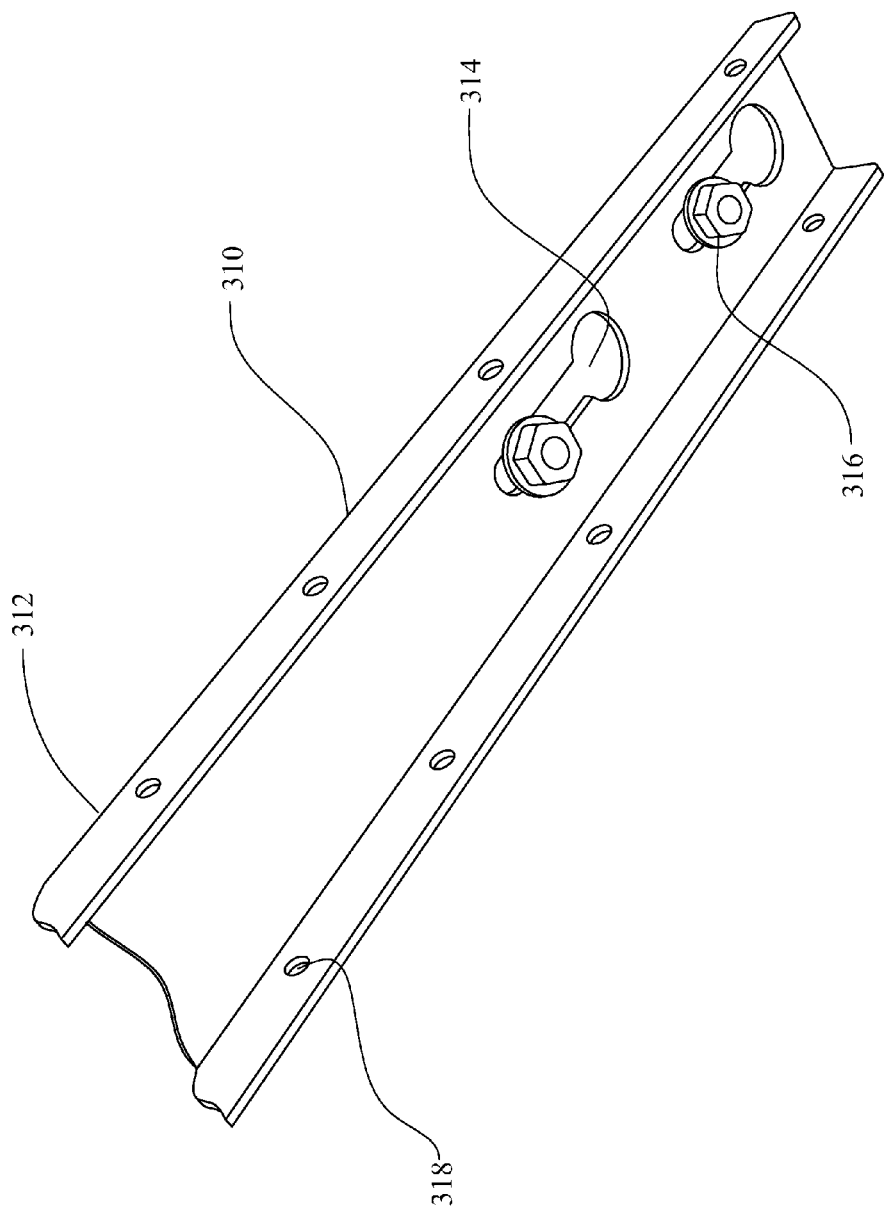
FIG. 10 presents a perspective view of the ceiling rail utilizing a plurality of flange nuts secured to the adjustable joist support bracket mounting system to retain the ceiling rail thereto.
Figure 11:
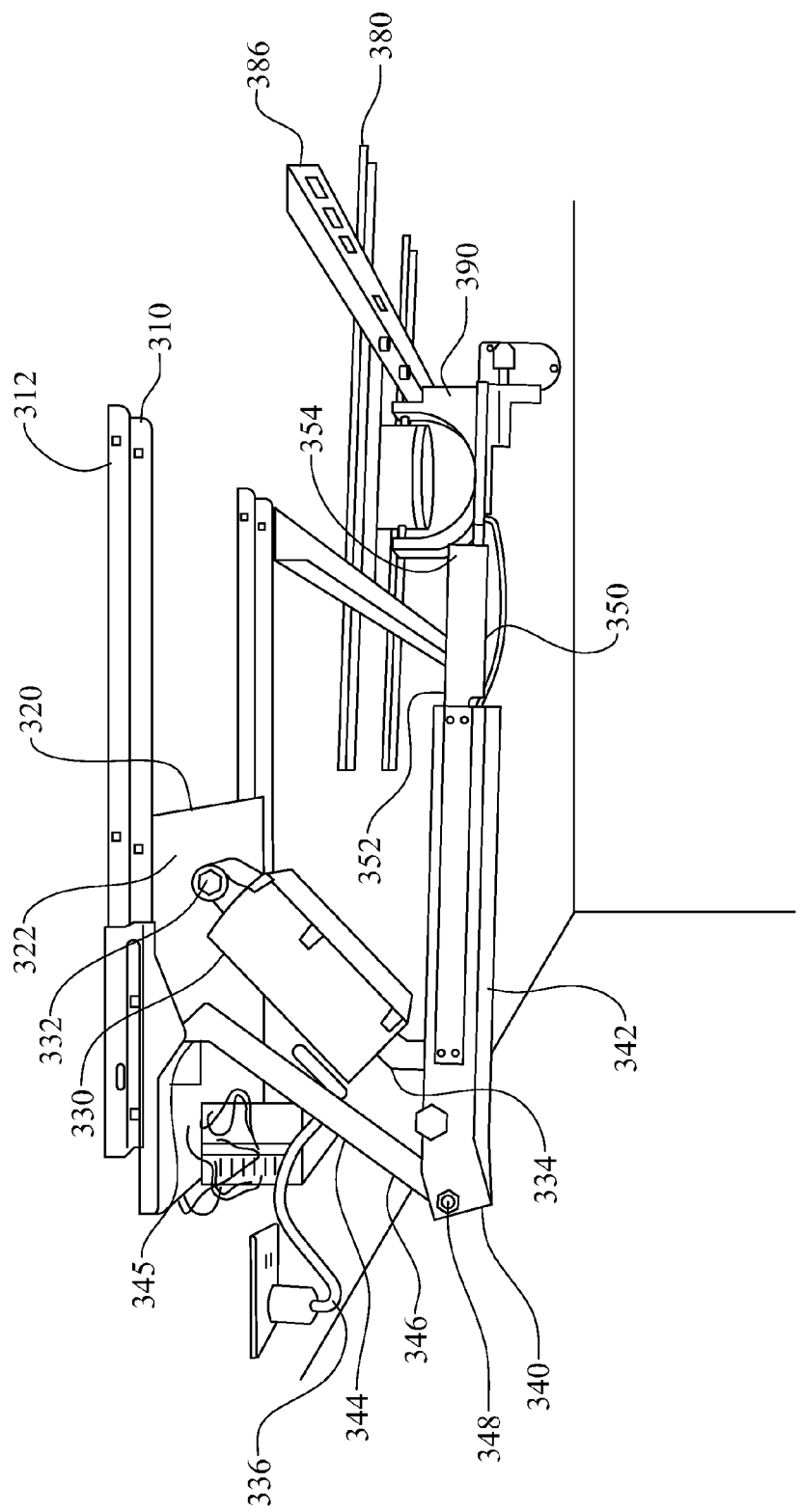
FIG. 11 presents an perspective side view of the adjustable television ceiling mounting system illustrated in the retracted configuration.
Figure 12:
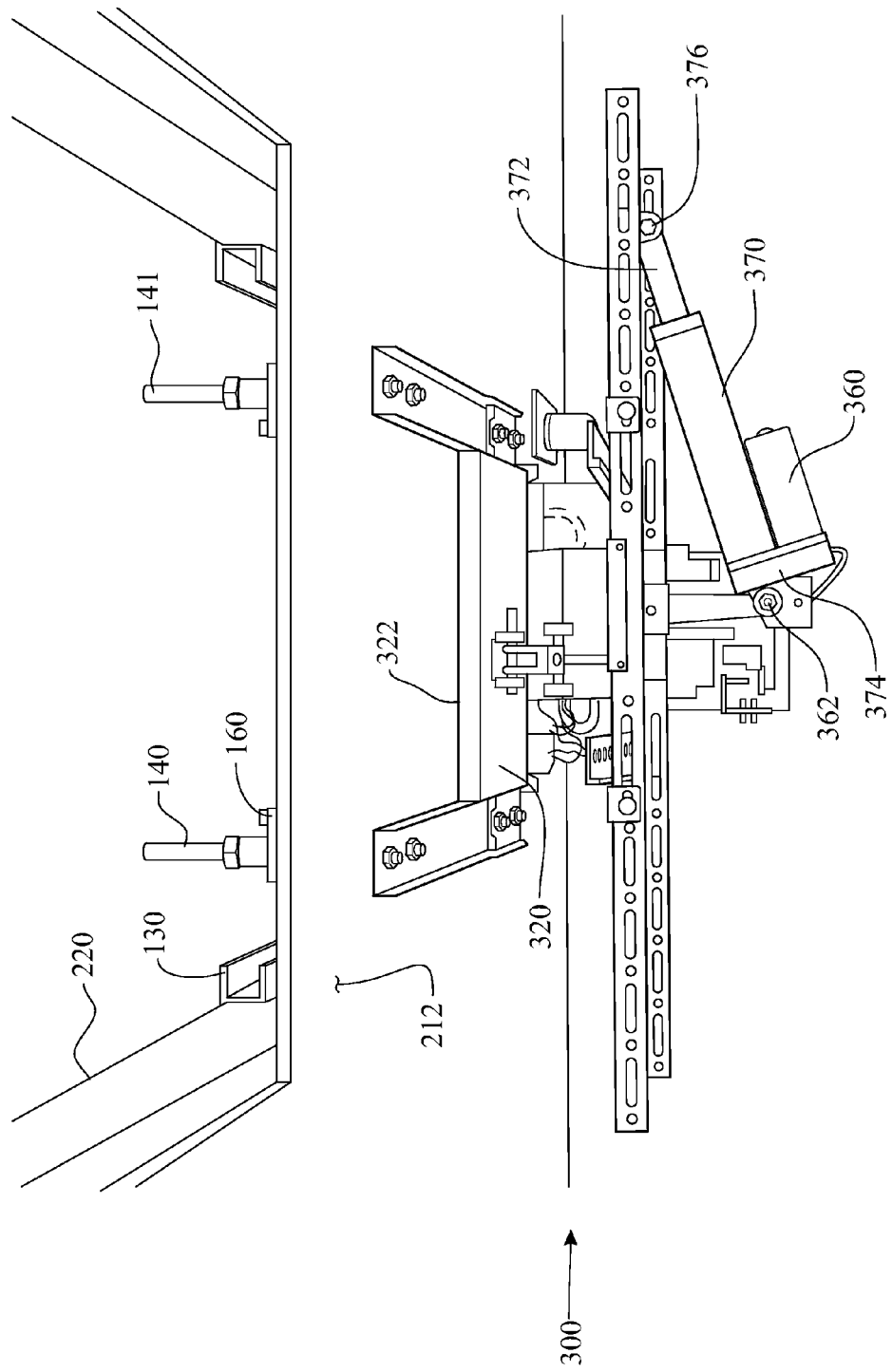
FIG. 12 presents a perspective front view of the adjustable television ceiling mounting system illustrated in the retracted configuration.
Figure 13:
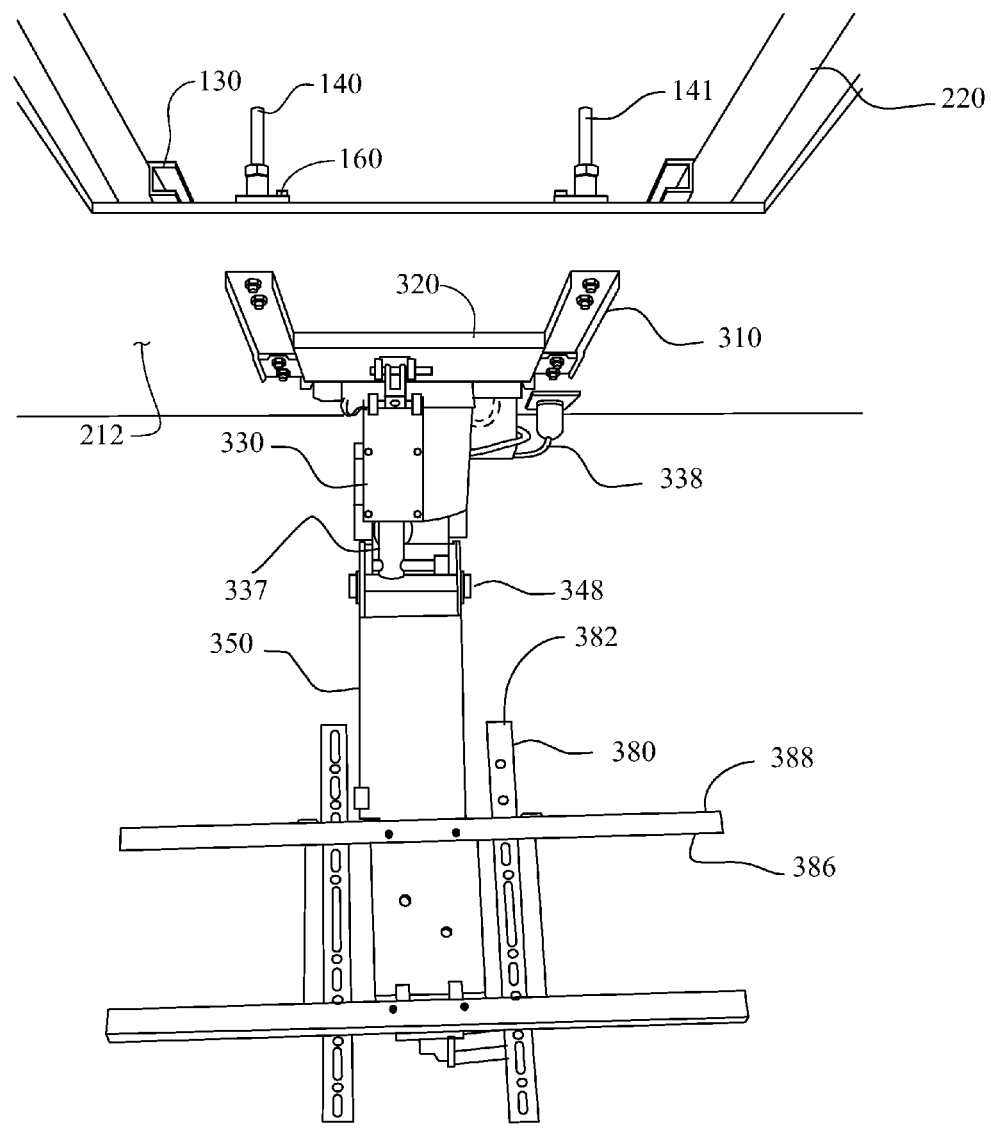
FIG. 13 presents a perspective front view of the adjustable television ceiling mounting system, exclusive of a television, wherein the illustration presents the mounting system in the extended configuration.
Figure 14:
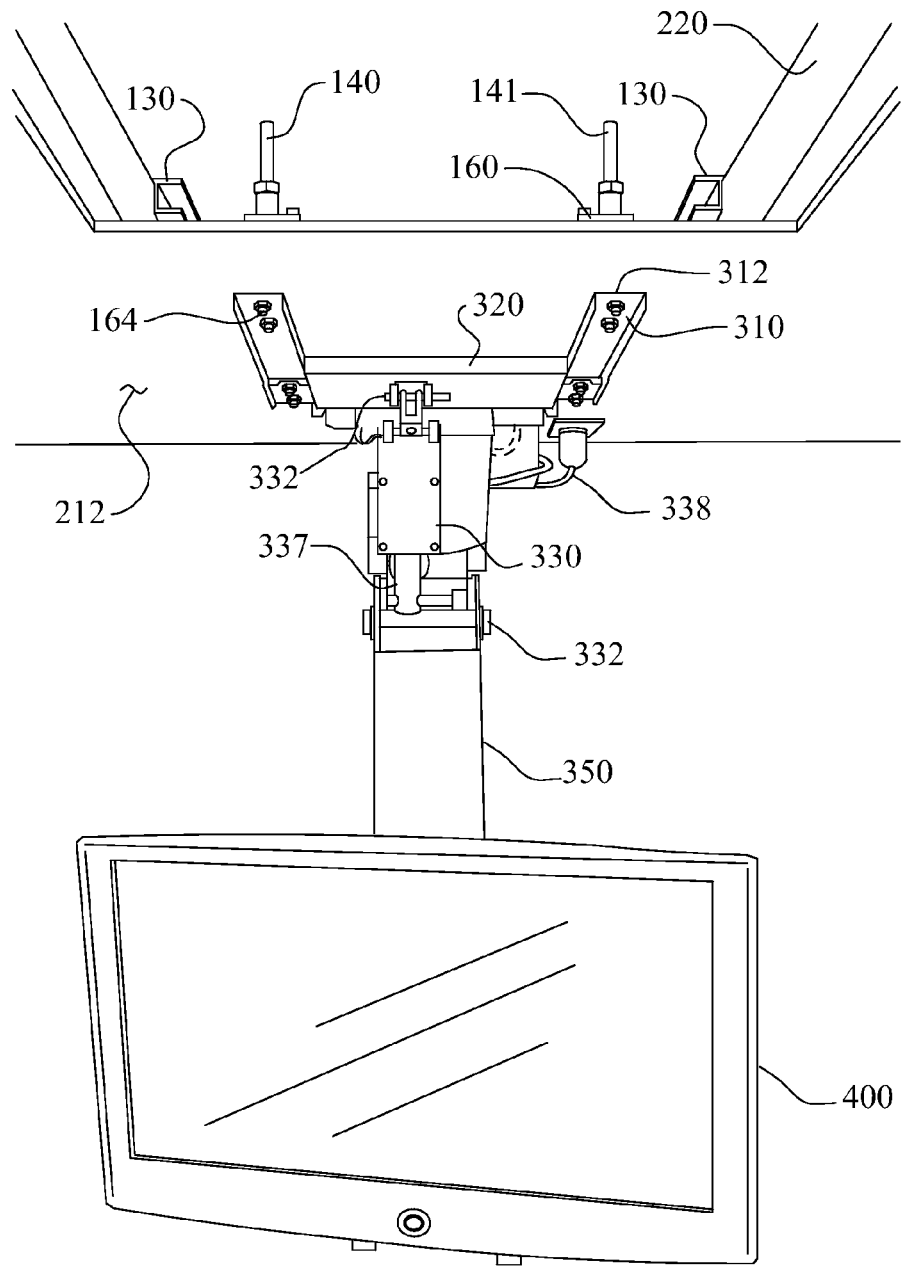
FIG. 14 presents a perspective front view of the adjustable television ceiling mounting system, inclusive of a television, wherein the illustration presents the mounting system in the extended configuration.
Figure 15:
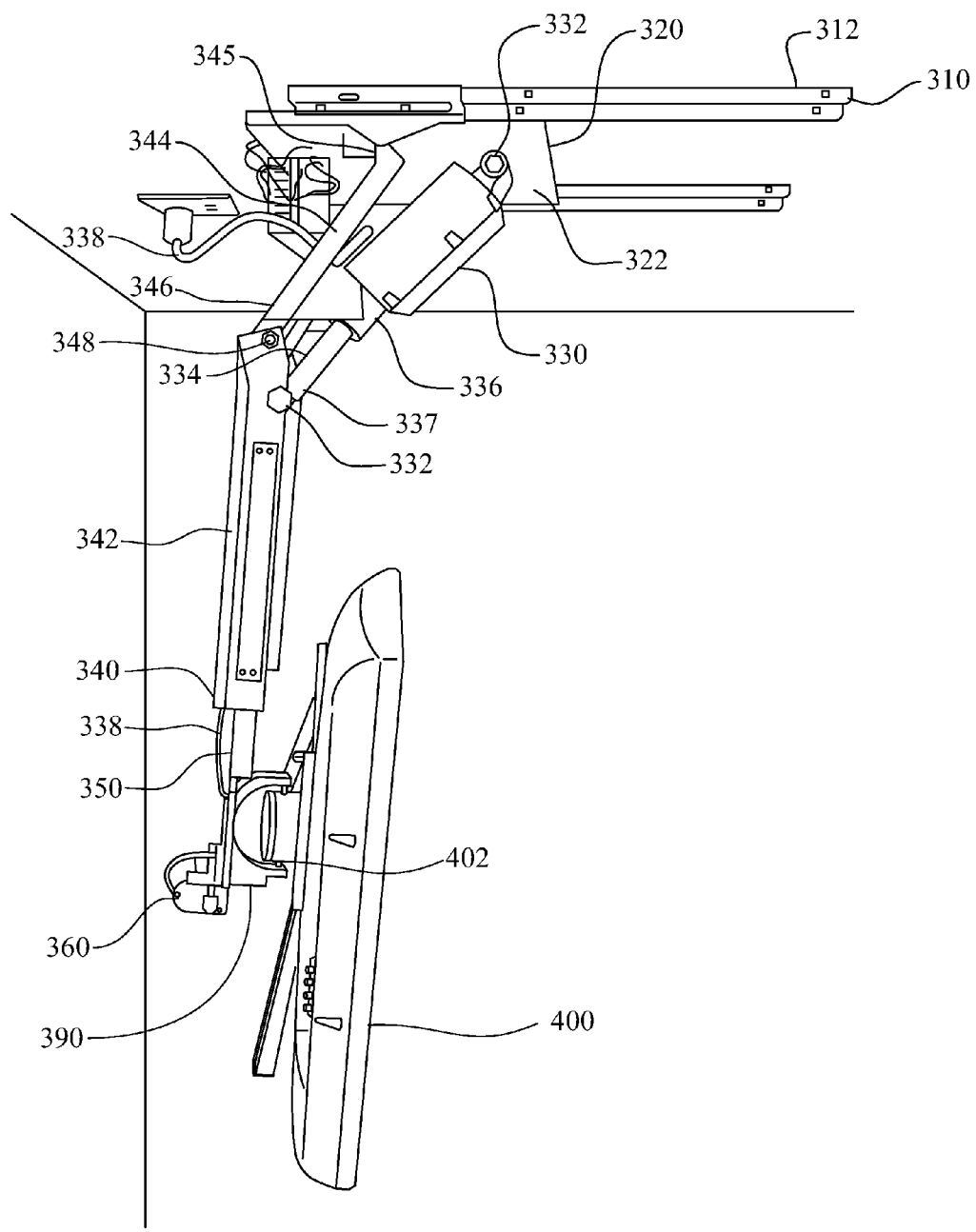
FIG. 15 presents a side view of the adjustable television ceiling mounting system carrying a television, the mounting system being illustrated in the extended configuration.
Figure 16:
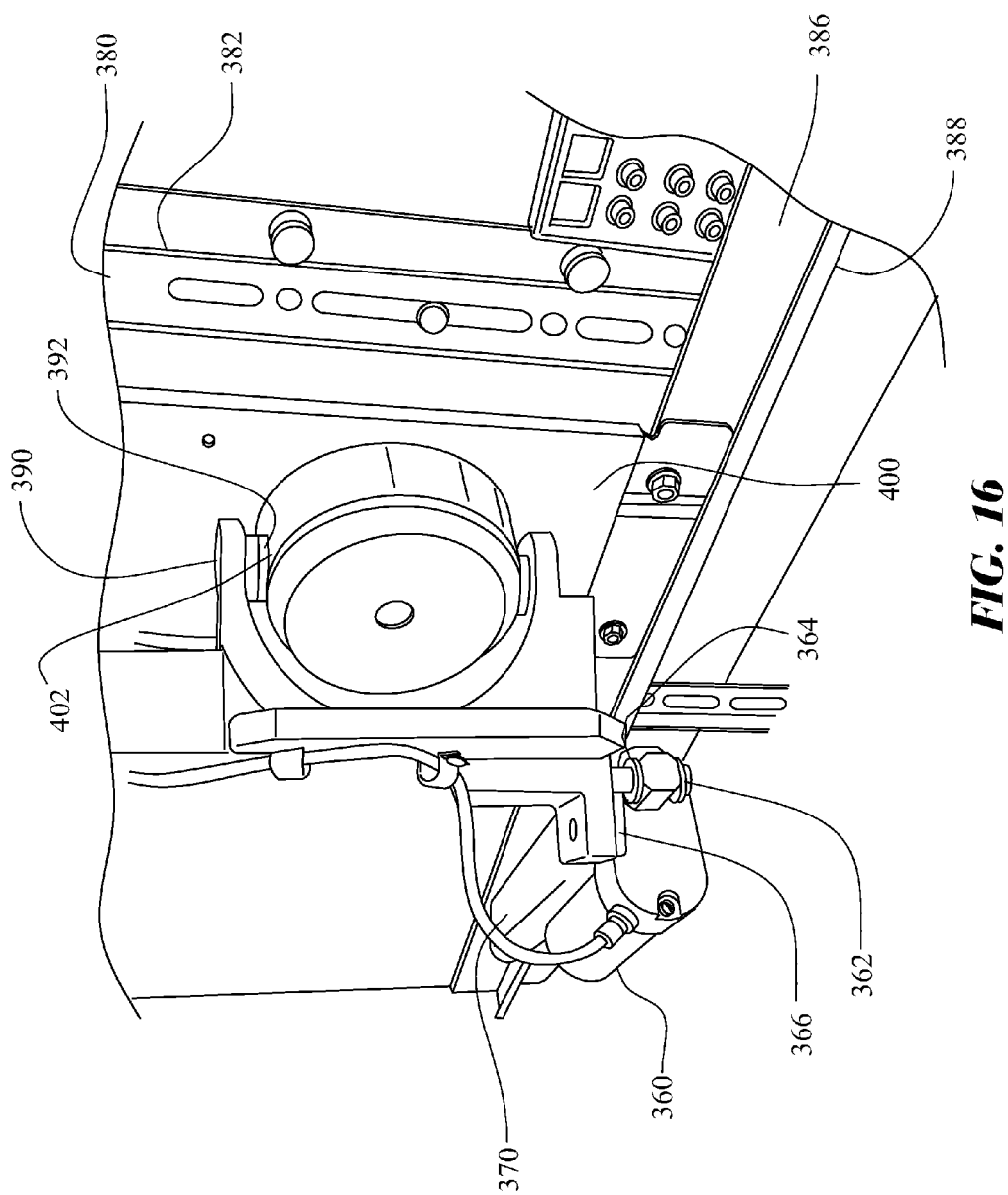
FIG. 16 presents a detailed perspective view of a the television attachment bracket attached to the back of the television.
Figure 17:
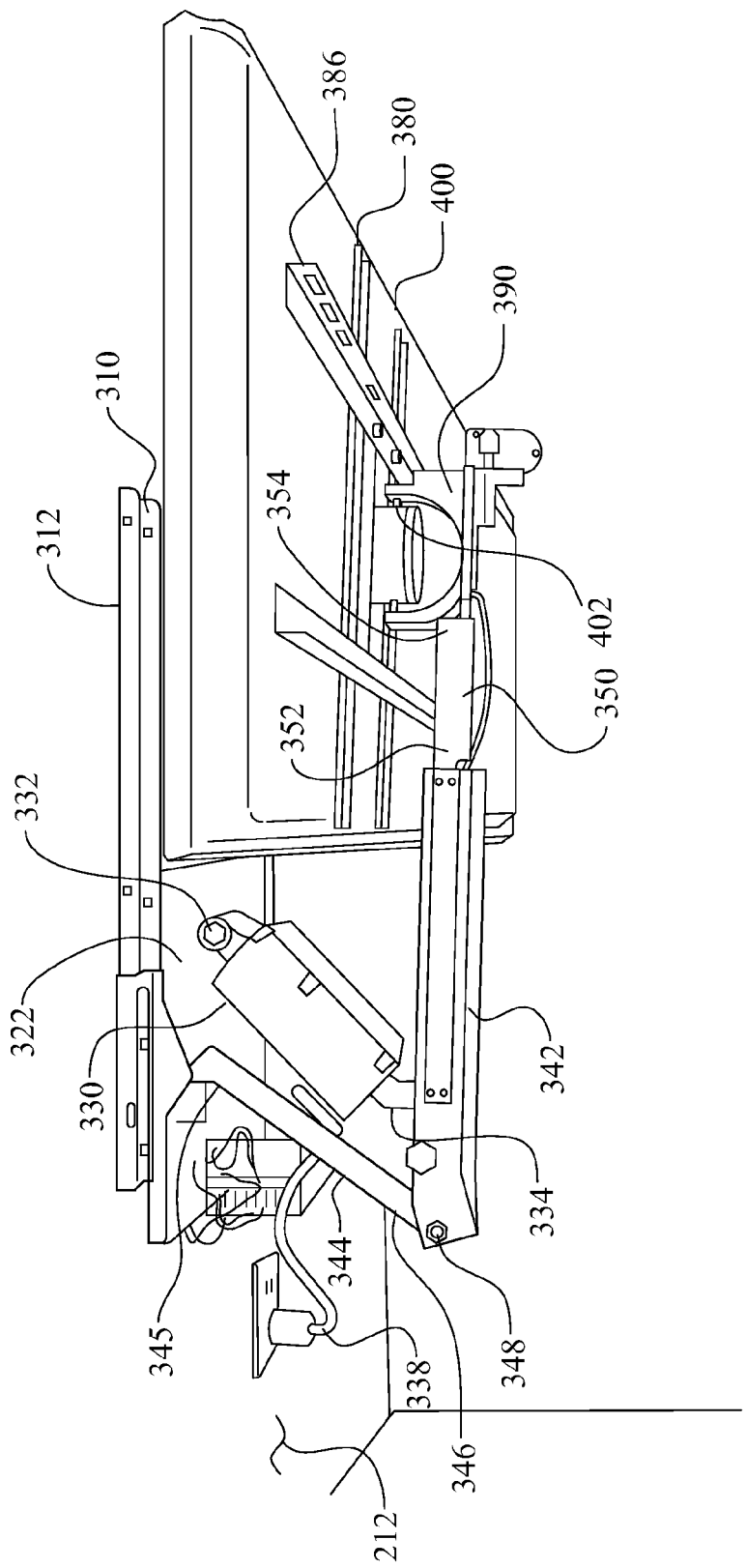
FIG. 17 presents a perspective side view of the adjustable television ceiling mounting system carrying a television, the mounting system being illustrated in the retracted configuration.
Figure 18:
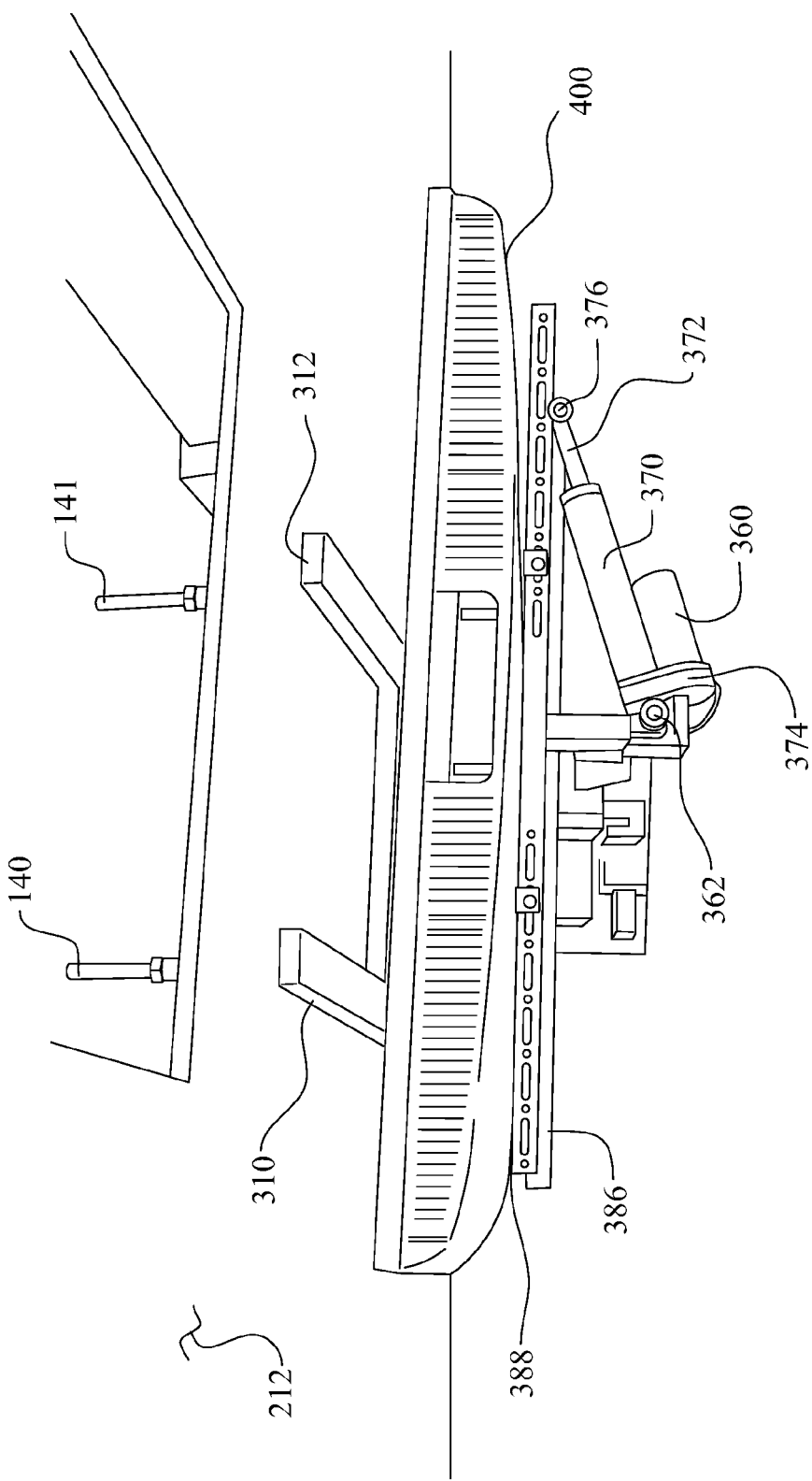
FIG. 18 presents a perspective front view of the adjustable television ceiling mounting system carrying a television, the mounting system being illustrated in the retracted configuration.

The adjustable joist support bracket mounting system 100 is designed to securely position onto, and support heavy objects from a ceiling assembly 200 by replacing vertical tensile forces applied to a mount inserted into the ceiling joist 220 with compressive forces applied to the joist upper surface 224. Details of the installation of the exemplary adjustable joist support bracket mounting system 100 are illustrated in FIGS. 6 through 8. In operation, the desired location on the ceiling board 210 to attach the object would be determined and marked accordingly on the exposed ceiling board surface 212. There is great flexibility in selecting a desired location to drill the associated apertures since the adjustable joist support bracket mounting system 100 is less dependent on the exact location of ceiling joists 220 to support objects. The locations of the apertures can be determined by measurements, use of a template, use of a bracket, and the like. The apertures are then drilled upward through the exposed ceiling board surface 212 at the desired locations. The adjustable joist support bracket mounting system 100 is prepared for positioning by first, loosening all the fittings, then being placed above the ceiling board 210. Each of the object support fasteners 164 is located in registration with each of the respective apertures and subsequently inserted therethrough. The loosened fittings enable easy adjustments to the various components of the adjustable joist support bracket mounting system 100. The object support bracket 160 rotationally attached to the vertical adjustment member 150 further enhancing the overall flexibility of the adjustable joist support bracket mounting system 100 during the installation process. This is particularly advantageous when the object support bracket 160 includes two or more object support fasteners 164. As the object support fasteners 164 pass through the respective apertures, the ceiling interface surface 162 is drawn against the concealed ceiling board surface 214. Each object support bracket 160 can be positioned along the telescoping beam assembly 110 by sliding the support assembly horizontal adjustment coupler 142 along members 112, 114. The flexibility of the adjustable joist support bracket mounting system 100 enables the user to initially align and locate the object support bracket 160 of the first object support subassembly 140, positionally adjust the second object support subassembly 141, and subsequently align and locate the object support bracket 160 of the second object support subassembly 141.

Following the process of locating each of the object support brackets 160, the adjustable joist support bracket mounting system 100 is further adjusted to locate each of the vertical joist mounting segment 134 to butt against the respective joist vertical surface 222 and the joist support surface 133 to rest against the joist upper surface 224. Vertical adjustments are accomplished by adjusting the vertical adjustment member 150 respective to the support assembly vertical adjustment sleeve 144. Horizontal adjustments are accomplished by extending or collapsing the telescoping beam assembly 110.

The horizontal adjustment of the telescoping beam assembly 110 enables the adjustable joist support bracket mounting system 100 to mate with two adjacent ceiling joists 220. The first telescoping member 112 and second telescoping member 114 telescope in either an extending or a collapsing direction, until each of the joist mounting bracket 130, 131 are positioned placing the vertical joist mounting segment 134 against the joist vertical surface 222. The joist mounting bracket 130, 131 pivot about the pivot fastener 139 to account for any angular relationship therebetween. The vertical and horizontal adjustments enable the installer to position the vertical joist mounting segment 134 parallel to and in contact with the joist vertical surface 222 and the joist support surface 133 parallel to and resting against the joist upper surface 224.

The installer inspects the adapted adjustable joist support bracket mounting system 100 in the proposed installation configuration to ensure that the adjustable joist support bracket mounting system 100 is optimized for supporting an object. Upon completion of the inspection, the installer begins the steps for locking each of the adjustment points into the established position. Initially, the installer can insert a mechanical fastener, such as a screw or lag bolt through each of the joist attachment apertures 137, continuing into the ceiling joist 220. The various locking members are employed to secure any potential adjustability of the adjustable joist support bracket mounting system 100. The installer would tighten the telescoping assembly lock 116 to eliminate any expansion or contraction of the telescoping beam assembly 110. The installer would secure any vertical motion of the vertical adjustment member 150. In the exemplary embodiment, the first object support subassembly 140 can utilize a first vertical positioning fastener 152 and/or a second vertical positioning fastener 154 to secure the vertical adjustment member 150 in a desired vertical location. The installer would tighten the horizontal setscrew 143 to affix the support assembly horizontal adjustment coupler 142 at a position along the telescoping beam assembly 110. The installer could additionally tighten the pivot fastener 139 to increase rigidity between the respective two adjacent ceiling joists 220.

When installed, the downward force applied by a weight of the supported object is transferred to a compressive force applied to the joist upper surface 224. This provides an extremely strong and reliable configuration for supporting the subject object.

The vertical adjustment is significant for several reasons: the joist upper surfaces 224 could be positioned at different elevations, objects in an attic could obstruct the adjustable joist support bracket mounting system 100 from placement in a desired location, objects secured to the ceiling assembly 200 might require height adjustments. Vertical adjustability of various components of the adjustable joist support bracket mounting system 100 is accomplished chiefly by raising or lowering the object support bracket 160 by vertically positioning each respective vertical adjustment member 150. When the first object support subassembly 140 and second object support subassembly 141 are properly adjusted, the joist support surface 133 rests flush onto the joist upper surface 224 (FIG. 6). After positioning the adjustable joist support bracket mounting system 100 vertically, the vertical adjustment member 150 can be locked into position using the first vertical positioning fastener 152 if the support assembly vertical adjustment sleeve 144 comprises the threaded interior surface 146, or the locked position could be accomplished by utilizing both the first vertical positioning fastener 152 and the second vertical positioning fastener 154 if the support assembly vertical adjustment sleeve 144 comprises a smooth interior surface 148.

In summation, the adjustable joist support bracket mounting system support system 100 is secured into location by adjusting and locking the various adjustable features thereof, and subsequently inserting fasteners such as screws, nails or the like through at least one joist attachment aperture 137.

Once the adjustable joist support bracket mounting system 100 is secured into location, the object being supported is positioned against the exposed ceiling board surface 212 and secured to the object support fastener 164.

The flexibility of the adjustable joist support bracket mounting system 100 enables the installer to adapt the adjustable joist support bracket mounting system 100 to virtually any installation environment. The adjustable joist support bracket mounting system 100 is designed to support significantly weighted objects at any desired location against the exposed ceiling board surface 212 in a reliable manner. The system is designed to be installed by one person.

An adjustable television ceiling mounting system 300 is described in FIGS. 9 through 16. The adjustable television ceiling mounting system 300 is an assembly comprising: at least one ceiling rail 310 having a ceiling rail contact surface 312 for abutting to the exposed ceiling board surface 212. The ceiling rail 310 comprises a flange nut slot 314 that passes through object support fasteners 164 and is secured to the exposed ceiling board surface 212 by a flange nut 316. Ceiling rail guide apertures 318 located on the external flanges of the ceiling rail 310 provide counting and guidance features that facilitate installation. The ceiling rail 310 can be fabricated of a steel or similar extrusion. A mounting platform mounting platform 320 preferably attaches between the ceiling rail contact surface 312, and rests parallel to the exposed ceiling board surface 212 with a mounting platform concealed surface 324. The mounting platform mounting platform 320 provides a stable base for the adjustable television ceiling mounting system 300.

A retracting motor 330 is pivotally attached to the mounting platform mounting platform 320 using a retracting motor pivot pin 332. The retracting motor 330 includes a power cord 338 to receive power and provide a retracting and extending functionality to the adjustable television ceiling mounting system 300. A retracting motor rotation bar 334 mechanically extends from the retracting motor 330 from a rotation bar first end 336, and attaches to a retracting arm 340 from a rotation bar second end 337. The retracting arm 340 attaches to a retracting arm brace 344 for proper alignment. A retracting arm brace first end 345 preferably attaches to the mounting platform exposed surface 322, while a retracting arm brace second end 346 pivotally attaches to the retracting arm 340 with a pivot pin 348. A retracting arm external housing 342 provides aesthetic qualities by hiding the power cord 338.

Those skilled in the art can appreciate the retracting arm brace 344 can be rigidly fixed to the retracting arm 340 in a less adaptive embodiment.

A swiveling arm 350 extends from the retracting arm 340 from a swiveling arm first end 352. A swiveling arm second end 354 preferably attaches to and provides support for a television attachment brace 390. The swiveling arm 350 is preferably fabricated from steel or similar extrusion to provide rigid support for the television 400. It is understood that the swiveling arm 350 rotates from the retracting arm 340 to create a lateral swiveling motion of up to 30 degrees. A swiveling motor 360 abuts against a hydraulic cylinder 370 and attaches to a swiveling motor mount 366. The swiveling motor mount 366 pivotally attaches to the swiveling arm 350 with a swiveling motor pivot pin 362 and a spacer 364 that compensates for different dimensions of televisions 400. It is understood that the swiveling motor 360 provides sufficient power to swivel a heavy television 400. The hydraulic cylinder 370 pivotally attaches to a horizontal television rail 386 with a hydraulic cylinder pin 376 from hydraulic cylinder first end 372. A hydraulic cylinder second end 374 attaches to the television attachment brace 390. It is understood that the hydraulic cylinder 370 is capable of interacting with the swiveling arm 350 as a mechanical actuator to provide linear stability for the swiveling function and allow for small swiveling increments.

A pair of vertical television rails 380 perpendicularly cross a pair of horizontal television rails 386 to provide structural support and attachment points for the back of the television 400. The vertical television rail 380 is positioned outside the horizontal television rail 386, thereby allowing a vertical television rail contact surface 382 to abut the back of the television 400. It is understood by those skilled in the art that in a different embodiment, the horizontal television rail 386 is positioned outside, thereby creating a horizontal television rail contact surface 388 to abut the back of the television 400. The television 400 is further supported by a television attachment brace 390, which extends from the swiveling arm second end 354 and secures the television mounting surface 401 with a television attachment brace contact surface 392.

Once the adjustable television ceiling mounting system 300 is installed and the television 400 is attached, the adjustments can occur by remote control.

The adjustments are significant for several reasons: the retracting arm 340 extends the television 400 to a lower height—up to 180 degrees vertical—to provide more accessibility to the television 400 for the audience. The retracting arm 340 then retracts the television 400 up and parallel to the exposed ceiling board surface 212 for convenient, out-of-the-way storage. The swiveling arm 350 rotates the television 400 up to 30 degrees for more dynamic viewing angles. This is especially significant with new, emerging 3-D television technology.

The flexible, secure attachment of the adjustable television ceiling mounting system 300 to the exposed ceiling board surface 212 is significant for several reasons: the adjustable joist support bracket mounting system 100 provides a more secure connection to the ceiling assembly 200 by utilizing compressive forces rather than tensile forces on a specific point of the ceiling joist 220. This secure attachment provides greater anti-theft capabilities and eliminates the problem of the television 400 falling from the ceiling board 210. The adjustable joist support bracket mounting system 100 also allows the adjustable television ceiling mounting 300 to be positioned anywhere on the ceiling assembly 200 irrespective of the location of the ceiling joist 220.

The flexibility of the adjustable television ceiling mounting system 300 enables the installer to position the adjustable television ceiling mounting system 300 to virtually any ceiling assembly 200 environment. The adjustable television ceiling mounting system 300 is designed to adjust the television 400 in myriad dynamic viewing positions. The adjustable television ceiling mounting system 300 is designed to be installed by one person.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What I claim is:

1. An adjustable joist support bracket mounting system for securely mounting objects on the ceiling, the adjustable joist support bracket mounting system comprising:
    a telescoping beam assembly comprising a first telescoping member, a second telescoping member slideably engaging with said first telescoping member, and a telescoping assembly lock, wherein said telescoping assembly lock secures said first telescoping member and said second telescoping member together;
    a pair of joist mounting brackets, each joist mounting bracket comprising a joist support surface, wherein said each joist mounting bracket is pivotally assembled to the telescoping beam assembly at a respective end thereof; and
    at least one object support subassembly comprising:
        a support assembly horizontal adjustment coupler slideably assembled to the telescoping beam assembly,
        a support assembly vertical adjustment sleeve carried by the support assembly horizontal adjustment,
        a vertical adjustment member passing through the support assembly vertical adjustment sleeve,
        at least one vertical positioning fastener for securing the vertical adjustment member at a vertical position,
        an object support bracket carried by the vertical adjustment member, and at least one object support fastener attached to the object support bracket.

2. An adjustable television ceiling mounting system for adjusting a viewing perspective of a television from a ceiling, said adjustable television ceiling mounting system comprising:
    at least one ceiling rail, said ceiling rail comprising a ceiling rail contact surface, at least one flange nut slot, at least one flange nut, and a ceiling rail guide aperture, wherein said ceiling rail abuts against an exposed ceiling board surface and secures to an object support fastener with said flange nut;
    a mounting platform having a mounting platform exposed surface and a mounting platform concealed surface;
    a retracting motor pivotally attached to said mounting platform;
    a retracting motor rotation bar extending from said retracting motor at a rotation bar first end;
    a retracting arm attached to said retracting motor rotation bar at a rotation bar second end, the retracting arm comprising a retracting arm external housing for hiding a power cord;
    a retracting arm brace defined by a retracting arm brace first end attached to said mounting platform, and a retracting arm brace second end pivotally attached to said retracting arm;
    a swiveling arm defined by a swiveling arm first end extending from said retracting arm, and a swiveling arm second end;
    a swiveling motor, said swiveling motor pivotally attached to a swiveling motor mount;
    a hydraulic cylinder pivotally attached to said swiveling motor mount, said hydraulic cylinder defined by a hydraulic cylinder first end and a hydraulic cylinder second end;
    a vertical television rail having a vertical television rail contact surface attached perpendicularly to a horizontal television rail having a horizontal television contact surface; and
    a television attachment brace attached to said swiveling arm second end, the television attachment brace having a television attachment brace contact surface for attaching to and abutting against a television mounting surface.

* * * * *